United States Patent [19]
Fields et al.

[11] Patent Number: 5,139,609
[45] Date of Patent: Aug. 18, 1992

[54] APPARATUS AND METHOD FOR LONGITUDINAL DIODE BAR PUMPING OF SOLID STATE LASERS

[75] Inventors: Renny A. Fields, Los Angeles; Todd S. Rose, Long Beach; James S. Swenson, Jr., El Segundo, all of Calif.

[73] Assignee: The Aerospace Corporation, El Segundo, Calif.

[21] Appl. No.: 654,430

[22] Filed: Feb. 11, 1991

[51] Int. Cl.$^5$ ............... H01L 21/306; B44C 1/22; H01S 3/19
[52] U.S. Cl. .................. 156/643; 156/659.1; 156/662; 219/121.6; 372/50; 430/321; 359/641; 359/619
[58] Field of Search ............ 156/643, 636, 645, 654, 156/659.1, 662; 430/321, 323; 204/192.34; 219/121.6, 121.74, 121.75; 357/17, 19, 76, 77; 372/43, 44, 46, 50; 350/417

[56] References Cited

U.S. PATENT DOCUMENTS

| | | | |
|---|---|---|---|
| 4,428,647 | 1/1984 | Sprague et al. | 350/167 |
| 4,784,722 | 11/1988 | Liau et al. | 156/649 |
| 4,797,179 | 1/1989 | Watson et al. | 156/647 |
| 4,801,352 | 1/1989 | Pinczyk | 156/643 |

*Primary Examiner*—William A. Powell
*Attorney, Agent, or Firm*—William J. Burke

[57] ABSTRACT

The invention is a solid state laser resonator or amplifier which employs a longitudinal pumping scheme that provides efficient coupling of greater than 90 percent from the output of one or more high power diode bar arrays. The pumping scheme involves the use of monolithic microlens arrays that match the geometry of the laser diode bar arrays in a one to one manner. The output of each element in the diode bar is collimated by a single microlens in the array. The resultant array of collimated light beams is then configured to overlap by a second macroscopic lens, resulting in a single uniform spot within the laser gain medium. The resultant spot is also configured to overlap with the TEM$_{00}$ mode of the laser resonator so that efficient lasing action may occur. Overlapping the pump spot and the laser mode may be interpreted as having the pump spot size be less than or equal to the laser mode size so that all the pump light is absorbed within the mode of the laser.

19 Claims, 6 Drawing Sheets

APPARATUS AND METHOD FOR LONGITUDINAL DIODE BAR PUMPING OF SOLID STATE LASERS

STATEMENT OF GOVERNMENT INTEREST

The invention was made with Government support under Contract No. F04701-88-C-0089 awarded by the Department of the Air Force. The Government has certain rights in the invention.

BACKGROUND OF THE INVENTION

1. Field of the Invention

The invention generally relates to lasers and in particular to a highly efficient, moderately powered, and comparatively low cost diode-pumped solid-state laser and laser amplifier.

2. Description of the Prior Art

Since their introduction in the 1960's, lasers have been incorporated into a wide range of commercial and defense applications in fields as diverse as communications, information storage, information processing, printing, materials processing, and medicine.

Optical power output and input-to-output power conversion efficiency, as well as output wavelength, are characteristics which often determine the suitability of a laser for a particular application. For example, large, continuous-wave gas ion lasers are employed in applications which require about 10 watts of output power. The disadvantages of such lasers include their large size and inefficient performance. In addition, ion lasers of this sort typically require 10 kilowatts of input power and 4 gallons per minute of cooling water.

Solid-state lasers pumped by individual laser diodes have proven to be particularly useful in low power applications (heretofore up to about 2 watts) because of their compact size and efficiency. In the latest generation of diode-pumped solid-state lasers, the lasing material is pumped by means of monolithic laser diode arrays. A wide range of applications can be satisfied by diode-pumped solid state lasers. Techniques like intracavity frequency doubling and frequency mixing can be used to manipulate the output wavelength. They can also be configured to operate as optical amplifiers.

However, solid-state lasers have not been able to satisfy applications demanding higher power in a compact package. For example, Sony has demonstrated that a solid-state laser can read and write data on optical disks (compact or video disks). However, lasers with adequate power are not sufficiently compact and economical to help this technology penetrate the consumer market. Similarly, the low powers presently available from solid-state lasers have been a major factor in the slow pace of developing high data-rate intersatellite communications systems.

The source of the major limitation on solid-state lasers is the efficiency and effectiveness of the pump source. The majority of commercial 10 watt solid-state lasers presently sold are based on flash or arc lamp pumped lasers. In such lasers, a large fraction of the pump light is absorbed by portions of the laser rod which do not participate in the generation of laser output. This unutilized pump energy adds additional heating while reducing efficiency. In addition, the lamps have a limited lifetime (up to 1000 hours) for continuous wave applications.

To increase the overall laser efficiency, many groups have sought to develop lasers where the pump light is confined purely to the laser cavity mode. Over twenty years ago, it was shown that longitudinal pumping of lasers could significantly increase the gain and could be a far more efficient optical process than transverse pumping. As early as 1968, Birnbaum et al. (App. Phys. Lett. 12, 225 (1968)) demonstrated pulsed operation of a ruby laser by imaging the output laser light from an argon ion laser longitudinally into the lowest order transverse mode ($TEM_{00}$) defined by the cavity of the ruby laser. This laser was optically efficient both because of the geometrical overlap of the pump beam with the laser mode and because of the strong spectral overlap of the pump and the absorption band of the laser medium.

A more recent laser design was the superluminescent diode end pumped neodymium laser, proposed in 1979 by Kubodera et al. (Applied Optics 18(6), 882 (1979)). A relatively high overall electrical efficiency was projected and later achieved by longitudinally pumping a $Nd^{3+}$ crystal with a laser diode.

A more important step in this direction was achieved in 1985 by Sipes, who demonstrated that a diode laser phase coupled array could be effectively imaged into the $TEM_{00}$ mode of a small Nd:YAG laser. The phase coupled array had an effective aperture of 16 by 100 microns, while the laser mode had a diameter of 180 microns. (Applied Physics Letters, 47(2), 74 (1985)) Sipes observed an increase in the optical conversion efficiency due to the increased pump power density in the small $TEM_{00}$ laser mode. The pump power-density (power/unit volume) was increased by focussing the laser diode solely on the portion of laser material contained within the $TEM_{00}$ mode. The additional high efficiency of the laser diode resulted in a significantly improved overall device efficiency of 8%. With a few minor modifications to this technique, overall electrical efficiency was increased to 19% by Fields et al. in a diode laser array pumped $Nd^{3+}:YVO_4$ laser. Similar performance was obtained by imaging broad area single stripe laser diodes of similar dimensions and power. These techniques are disclosed in the following patents: Sipes, U.S. Pat. No. 4,710,940, Baer et al., U.S. Pat. No. 4,701,929, and Byer et al. U.S. Pat. No. 4,739,507.

However, lasers which rely on imaging the output from a single diode-laser element are not able to satisfy applications which require 1 watt or more of output power. By diode laser element, we mean a phase coupled group of closely spaced stripes or a single broad-area stripe. Several groups have attempted to obtain higher pump powers by capturing the output of many diode laser elements with fibers and then grouping the fibers into a bundle so that the resultant output can be imaged on the laser rod. This approach falls short, in part due to the limited diode laser-to-fiber coupling efficiency (typically only 50%) and the complexity of coordinating many components.

A more cost effective approach to increased power has been the use of a diode laser bar to pump the laser. Spectra Diode Labs Model No. 3400 series is a typical example. This bar consists of separate groups of gain-guided phase-coupled GaAlAs laser diode stripes, (i.e., several separate diode laser elements). It has been claimed that a 1 cm bar composed of 10 groups of 20 phase-coupled stripes can yield 10 watts of pump power over a reasonably long life (5000-8000 hours). (Elec. Letter 25, 972 (1989)). Similar bars have been developed by others where each element on the bar is a broad area laser.

However, the problem of concentrating the pump light output from such bars, into the laser cavity, has presented significant obstacles to the effective use of these bars. Three relevant approaches have been pursued. In U.S. Pat. 4,818,062, Scifres et al disclosed a technique to couple a gain guided laser bar 11 into a single waveguide 17 or multiple waveguides 103 made up of optical fibers. This approach is limited by the coupling efficiency of the bar to the fibers.

Baer, in U.S. Pat. No. 4,837,771, modified the resonator and quasi-longitudinally pumped solid-state laser material by imaging the spatially separate emissions from a 10 element diode-laser bar onto the reflection points in a tightly folded resonator. This approach is more efficient than the previously mentioned fiber bundle technique and it more effectively distributes the resultant pump-induced heating. However, the tightly folded resonator has demonstrated only about 40% optical conversion for diode pump light to $Nd^{3+}$ laser light out. This is a result of the imperfect match between the diode laser pump bar emitters and the tightly folded laser resonator mode.

It was recently shown by Fan et al. that if one could collimate an array of sources, then the array of collimated sources could be focussed by a single large lens to a single spot. (Optics Letters 14, page 1057 (1989)). A group from General Dynamics attempted such a collimation on a standard Spectra Diode Mod. No. 3400 Bar by using an array of 20 microlenses to match up with the gain-guided bar emitters. Only 50% of the diode laser bar light could be effectively collected at the focal spot. The nonuniform wavefront of each of the gain-guided multi-stripe bar elements prevented satisfactory collimation of the light by a single microlens element, thus limiting the final focusing of the all the light sources.

OBJECTIVES

Therefore, the objective of this invention is to produce an efficient, compact, long-lived, low-cost, high-power solid-state laser system.

It is another object of this invention to maximize the power delivered to the laser medium from the pump source.

It is also the object of this invention to stimulate the laser medium by light that is longitudinally injected into the laser mode from one or more monolithic laser diode bar arrays.

An additional objective is an efficient method for coupling the light of one or more diode bar arrays into the laser medium.

Another objective of this invention is to produce a laser system which not only yields light in the near IR, but can also be readily modified to emit light in the visible and ultraviolet.

Yet another objective of this invention is to produce a laser system which can be adapted to serve as an amplifier.

Also it is the objective of this invention to yield a laser system which can be operated in either a cw or pulsed mode of operation.

Another objective of this invention is a laser system which minimizes the number of optical components to achieve a certain power.

SUMMARY OF THE INVENTION

The invention discloses a longitudinally diode-pumped solid-state laser system. The outputs of an array of index-guided single-mode lasers are collimated by a matched array of hyperbolic lenses, manufactured in accordance with the technique disclosed in this application. This optical pumping scheme efficiently couples the light from one or more diode bar arrays longitudinally into the $TEM_{00}$ mode of a solid-state laser and minimizes the waste heat while maximizing the output power and lifetime of the device.

The microlens array is designed to be positioned in front of a diode bar array so that each lens lines up with a corresponding emitter. Each microlens captures and collimates the light from a single emitting index-guided element. A second macroscopic lens is then used to overlap the individual light emissions into a single spot that matches the mode of the laser. Consequently, the output of the diode bar is transformed into a usable spot for longitudinally pumping the laser medium. Furthermore, the same final lens can overlap the output of additional diode bar-microlens assemblies to increase the available power for pumping.

Using the above technique, input power on the order of 10 watts per diode bar can be converted at near perfect efficiency into 5 to 6 watts of output power, utilizing only a few components possessing long-life.

DETAILED DESCRIPTION OF THE PREFERRED EMBODIMENT

The invention is a solid-state laser resonator or amplifier which employs a longitudinal pumping scheme that efficiently couples the output of one or more high power diode bar arrays. The pumping scheme involves the use of monolithic microlens arrays that match the geometry of the laser diode bar arrays in a one-to-one manner. The output of each element in the diode bar is collimated by a single microlens in the array. The resultant array of collimated light beams is then configured to overlap by a second macroscopic lens, resulting in a single uniform spot within the laser gain medium. The resultant spot is also configured to overlap with the $TEM_{00}$ mode of the laser resonator so that efficient lasing action may occur. Overlapping the pump spot and the laser mode may be interpreted as having the pump spot size be small enough as compared to the laser TEM$_{00}$ mode size so that all the pump light is absorbed within the TEM$_{00}$ mode of the laser.

Figure 1:
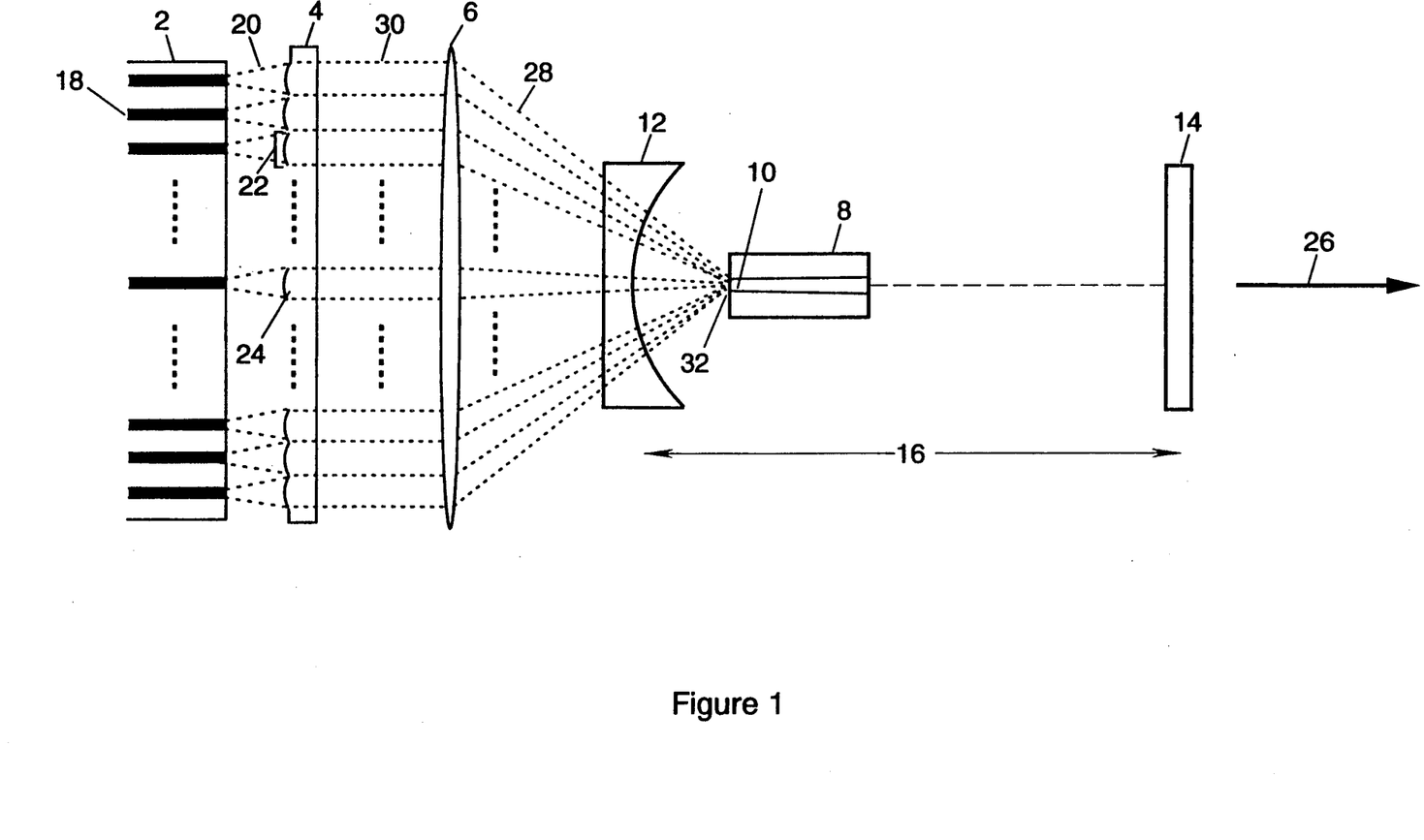
FIG. 1 is a plane view of a mode-matched solid-state laser longitudinally pumped by a diode laser bar array.

As illustrated in FIG. 1, a preferred pumping arrangement and laser resonator includes a diode bar array 2, a microlens array 4, macroscopic lens 6, laser material 8, laser resonator mode 10 and mirrors 12, 14 which define a laser cavity 16.

The diode bar 2, consisting of an array of single stripe, index-guided, single transverse mode diode lasers 18, is used as the source of pump light for the laser material 8. Diode bar 2 is in turn powered by a DC power supply and maintained at a constant operating temperature by a thermoelectric cooler.

As light 20 is emitted from the single mode lasers 18, it rapidly diverges in both the horizontal and vertical planes to form spots 22 on the microlenses 24. The matched array 4 of microlenses 24 is placed in front of the diode bar 2. The lenses 24 are formed on a single substrate, such as gallium phosphide, and are spaced to permit alignment with the diode laser stripes 18. The size and profile of the lenses 24 are determined by the divergence and wavelength characteristics of the emitted light 20, the final spot size required to match the mode 10 of the laser resonator and the index of refraction of the lens 24. In order to make use of the entire cross section of the lens 24 and minimize spherical aberration effects, hyperbolic lens profiles can be employed.

Figure 2A:
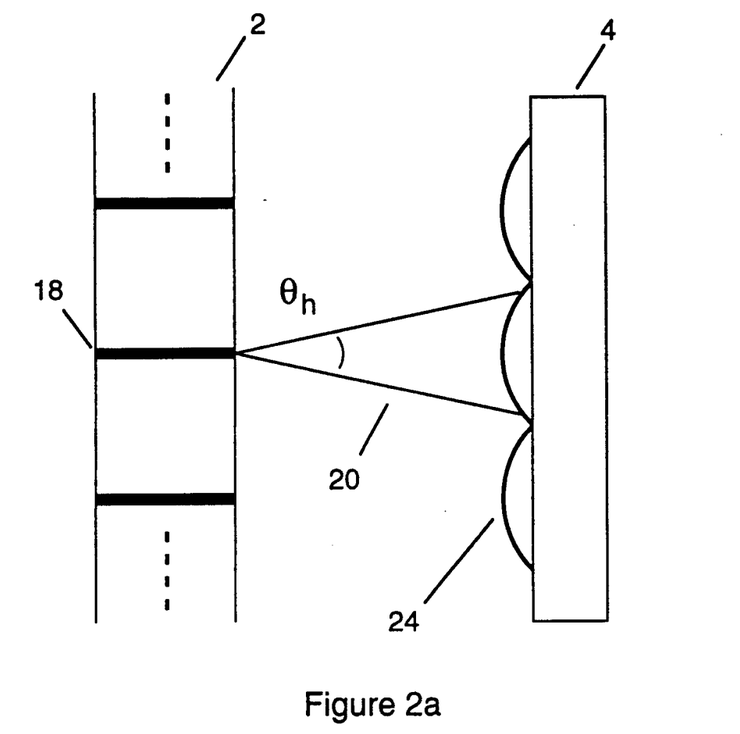
FIGS. 2a and 2b are top and side perspective views respectively of a single mode laser diode from the array illuminating an element of the microlens array.
Figure 2B:
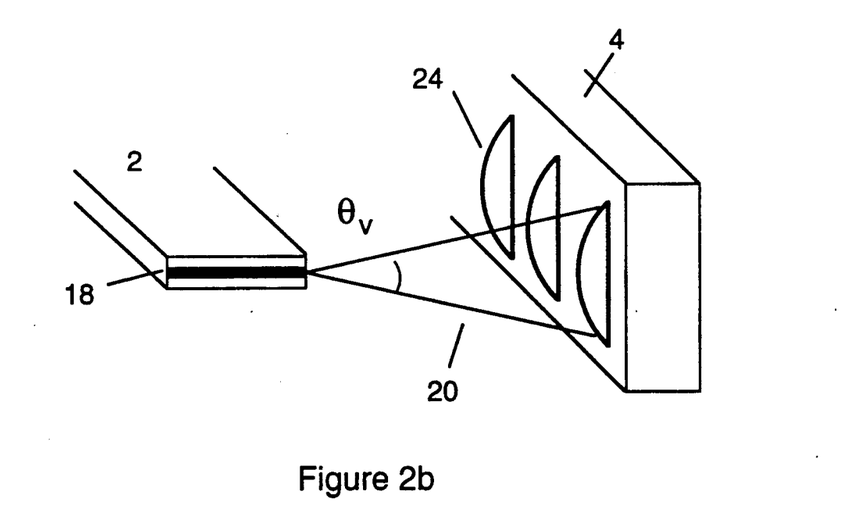

FIG. 2a and FIG. 2b illustrates the path of light 20 emitted by the diode laser 18. This light diverges at angle $\theta_h$ in the horizontal plane and at angle $\theta_v$ in the vertical plane and impinges upon a matching microlens 24 on lens array 4.

Referring again to FIG. 1, the array of collimated light beams 30 emerging from the lens array 4 is passed through the second, macroscopic lens 6 which overlaps the pump light 28 into a single spot 32. For maximum efficiency, this spot 32 is equal to or smaller than the laser mode 10.

Generally, the spacing of these elements is chosen to maximize the output power 26 while avoiding thermal overloading effects. In particular, the choice of focal length and location of the second lens 6 is made so as to maximize the overlap between the laser mode 10 and the pump light spot 32. Generally, the second lens 6 is placed close to the lens array to minimize space and thus only serves to overlap the beams.

The laser cavity 16 includes a block of laser material 8, such as Nd:YAG and two reflective surfaces or mirrors 12, 14. One mirror 14 may be partially reflective to the laser light in order to obtain output 26, and the other mirror 12 may reflect laser light but transmit the pump light 28.

As taught by the prior art, the cavity 16 may be further simplified by applying a reflective coating to one or both end surfaces of the laser material 8, thereby eliminating the need for one or both of the mirrors 12, 14. In addition, other intracavity elements, such as a doubling crystal, fractional waveplate, or a Q-switch, may be added to the cavity in order to produce wavelengths other than the fundamental (such as the second harmonic), narrower band widths, or pulsed outputs 26.

Figure 3:
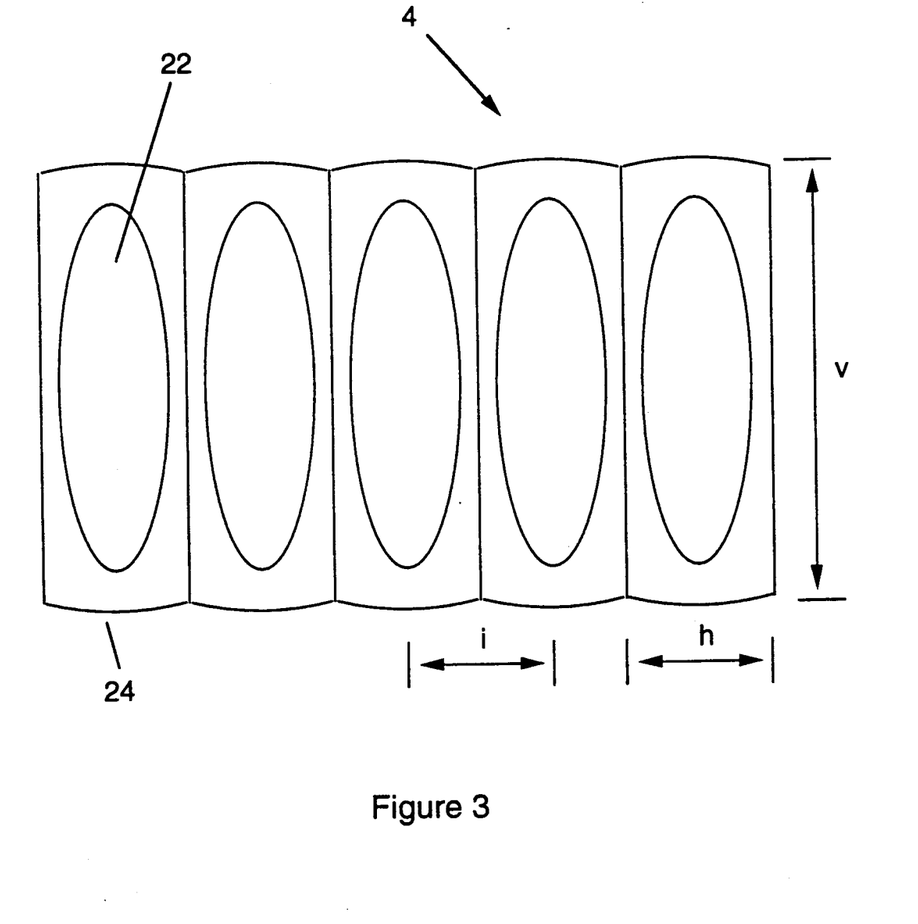
FIG. 3 is a head-on view of a microlens array illuminated by the diode bar array.

FIG. 3 depicts a small section of a typical array 4 of individual lenses 24. Each lens 24 has horizontal and vertical dimensions h and v, where h is equal to the interval spacing i between diode elements. The diode light 20 forms a spot 22 on each lens 24. The vertical extent v of the lenses 24 is full, while the horizontal extents h are truncated, to accommodate neighboring lenses. The aspect ratio of the lenses 24 is adjusted to the diode output divergences in the horizontal and vertical directions and the spacing of the diodes. Making the full diameter of each lens larger than the repetition interval allows the diverging beams of diode 18 to be captured at the largest beam spot size 22 that does not overlap with adjacent beam spots. A large beam spot size 22 is desirable to minimize the inevitable diffraction-limited divergence of each beam subsequent to collimation. That, in turn, minimizes the size of the final collective spot 32 formed by the macrolens 6 at the laser rod 8. Although the lenses 24 are not fully extended in the horizontal direction, each lens 24 is wide enough to collect all the light 20 from its corresponding laser diode element in the array and will not receive any light from neighboring elements. This is critical for yielding a single well-defined spot 32 with the secondary lens 6.

Referring again to FIG. 1, it has been found that index-guided single-mode laser diodes 18, as opposed to gain-guided devices, provide a better spatial profile of the output so as to allow effective collimation by the microlenses and recombination by the secondary lens 6. Furthermore, index-guided laser diodes operate more efficiently than the gain-guided laser diodes that are typically employed in diode bars. The spacing of the emitting elements in the diode bar is chosen to maximize the output power density of the device while avoiding thermal overloading effects and lifetime power degradation. One must also take into consideration the limitations of lithographic techniques to produce very small lenses, the divergence parameters of the individual diode emitters, and the requirement that there be no mutual coherence between adjacent stripes. Coherence effects would degrade the profile of the final spot 32. The largest possible microlens 24 should be used to collimate the output 20 of each diode laser element 18 so that one obtains the smallest focused spot 32.

Microlens

The optical material used for the microlens array is chosen according to several criteria: (a) it must be transparent at the wavelength of the laser diode array's output light; (b) it should have a high index of refraction in order to produce the desired lens behavior with a lens surface curvature small enough to be easily fabricated by photoresist microlithographic technology; (c) it should be more etchable than some convenient masking material, such as photoresist, by some etch technique, such as ion milling; and (d) it should be amenable to some controlled surface-smoothing method, such as mass transport driven by positive surface energy and activated by heat. Gallium phosphide crystal satisfies all of these criteria. Amorphous compounds or glasses, such as arsenic trisulfide, may also be used.

The following method of fabrication readily produces microlenses of high numeric aperture, in the closely packed arrays described above, with relatively little unusable area on the common borders.

First, the optical material is obtained or fabricated in the form of thin, flat wafers with polished front face, as is suitable for microlithographic processing.

Next, each wafer is subjected to several cycles of microlithographic masking and etching. In each cycle, masking material, such as photoresist, is patterned across the wafer in linear arrays of circles. The wafer is then subjected to a uniform etching process which erodes those areas of the wafer that are not covered by the masking material. The depth to be etched is precisely determined from the diameter of the circles in the arrays and the desired parameters of the finished lens. Ion milling is particularly used for this controlled process since it produces very uniform results. After the etching process, the masking material is removed and a subsequent cycle is begun by forming another pattern of circles (with masking material) which are concentric with the preceding etched circles, but are decreased in diameter with each successive cycle. The accumulated effect of many cycles is a terraced structure which approximates the desired surface shape of the microlens array.

Next, the wafer is cleaned with several techniques which remove from its surface any contaminating substances that interfere with the smoothing process, but which remove little or none of the substance of the wafer. Compared with cleaning by etchants, which could erode the surface non-uniformly, such non-etchant cleaning helps maintain the accuracy of the shapes created in the microlithographic cycles.

The wafers are smoothed by heating them to a sufficiently high temperature, for a given period of time. This heating is done in a controlled atmosphere which prevents oxidation and spontaneous decomposition. The use of highly toxic phosphine gas, typical of the prior art, can be avoided by sealing the microlens array wafer and a sample of elemental phosphorous in a quartz capsule. Use of phosphorus and encapsulation rather than phosphine and flowing gas increases the maximum achievable phosphorus activity. Higher phosphorus activity protects the gallium phosphide wafer from thermal decomposition at higher temperatures. Also, the rate of surface feature spreading increases exponentially with temperature. This technique can significantly shorten the duration of the smoothing process (i.e., from 1 week to 2 days), or permit the smoothing of significantly larger features. This is valuable because, at a given temperature, smoothing time is proportional to the fourth power of the step distance, which places a fairly firm upper limit on the size of this type of microlens.

EXAMPLE PUMPING CONFIGURATION

Referring to FIG. 1, a preferred configuration of the present invention consists of a ten watt diode bar 2 with a one centimeter width which possesses one hundred index-guided lasers 18, each with 100 milliwatt outputs and spaced on 100 micron centers. It was determined that the minimum center-to-center spacing for a 10 watt device should be on the order of 50 microns. Each element emits 100 milliwatts of light at a wavelength of 808 nanometers from an aperture of 1 by 3 microns. Thus, the total output power of this device is 10 watts. At this power level the lifetime of the device is estimated to be about 5000 hours, a longevity far exceeding the 200 hour life expectancy of commercially available arclamps. (M. Sakamoto, D. F. Welch, J. G. Endriz, E. P. Zucker & D. R. Scifres, Electron. Lett. 25, 972 (1989)).

In order to capture the rapidly diverging light 20, a preferred lens array 4 for the ten watt diode bar 2 described above consists of one hundred hyperbolic microlenses 24 spaced at intervals i=100 microns, each with a focal length and a height v=300 microns. A preferred embodiment for the remaining configuration uses a secondary lens 6 with a focal length of 2.1 centimeters at a distance of 1 centimeter from the microlens array 4.

Described below is a preferred technique for fabricating hyperbolic microlenses with v=160 microns, i=50 microns and a focal length of 150 microns, for use with light of 0.808 micron wavelength.

The microlens material is a gallium phosphide (GaP) wafer, crystal orientation "<100>", transparent at 0.808 micron, doped n-type with sulfur, polished on front and back faces, about 350 microns thick and 50 millimeters in diameter. On this wafer are executed nine stages of masking and ion milling in steps of 20 microns. A positive photoresist of 3 microns thick, such as type AZ-1375, is used with masks of iron oxide on quartz, broadband near-ultraviolet exposure, and a developer based on aqueous sodium hydroxide. An exposure apparatus capable of 0.5 micron alignment tolerance is selected.

Wafers with patterned resist are etched by ion milling with an argon beam 80 millimeters wide at an angle 30 degrees from perpendicular. Ion beam parameters, chosen for best uniformity and low heating, are 500 eV and 0.25 mA/cm$^2$, resulting in a GaP etch rate of 0.03 microns per minute. Etch amounts for each stage are approximately proportional to the circle diameter, ranging from 2.0 microns for initial 160 micron circles to 0.3 microns for 20 micron circles, and totalling about 10 microns for a finished lens with a diameter of 160 microns.

For the smoothing treatment, the wafer is cleaved to strips about 3 millimeters wide, cleaned thoroughly and placed with about 0.25 milligrams of solid red phosphorous into quartz tubes, which are then evacuated and sealed. The sealed quartz tubes are heated to about 1000 degrees Centigrade for 5 days.

This procedure can be easily adjusted to produce microlenses with 300 micron diameters, 300 micron focal lengths and 100 micron spacings. For the 300 micron focal length lenses 10 stages of 30 micron diameter steps are employed. The total etch amount is increased to about 20 microns, and the heat treatment temperature is increased from 1050 to 1100 degrees Centigrade.

A spot size 32 of less than 250 microns in diameter can be achieved by the combination of a 300 micron focal length microlens array and a 2.1 centimeter focal length macrolens. This spot size is small enough to pump a laser resonator configuration 16 employing a 10 centimeter curvature mirror 12 and a flat output mirror 14.

Thermal loading effects which will vary for different laser materials, may require enlarging the cavity mode by increasing the radius of curvature of mirror 12. The focal length of lens 6 would be adjusted accordingly to best fill the laser mode 10.

Figure 4A:
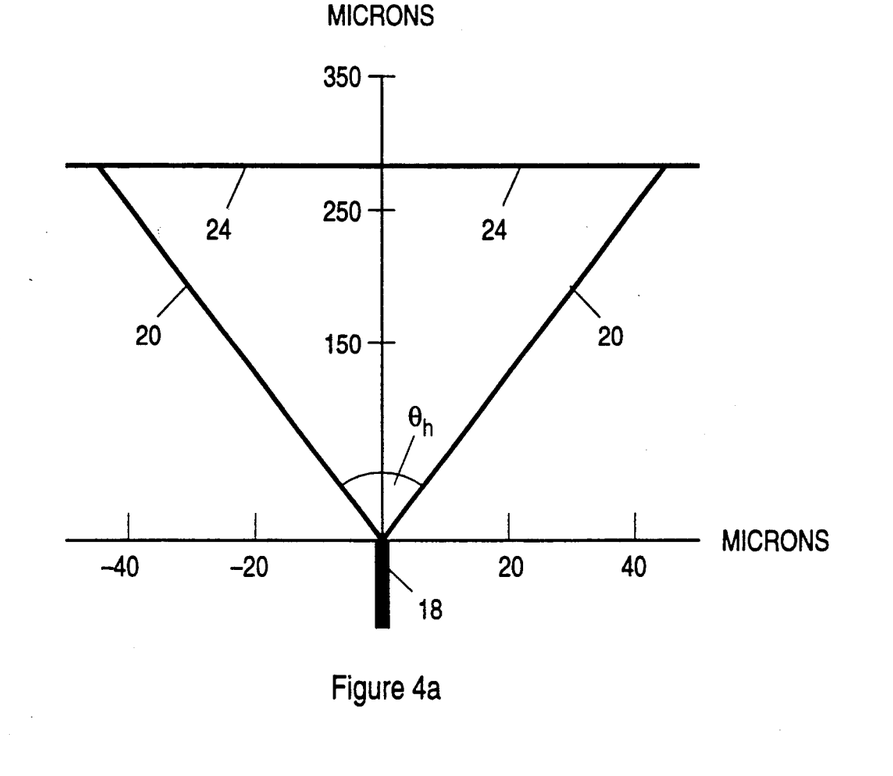
FIG. 4a shows the diode laser light ($1/e^2$ intensity) incident on a microlens element 24 in the horizontal direction. The diode 18 is located at the origin of the graph.
Figure 4B:
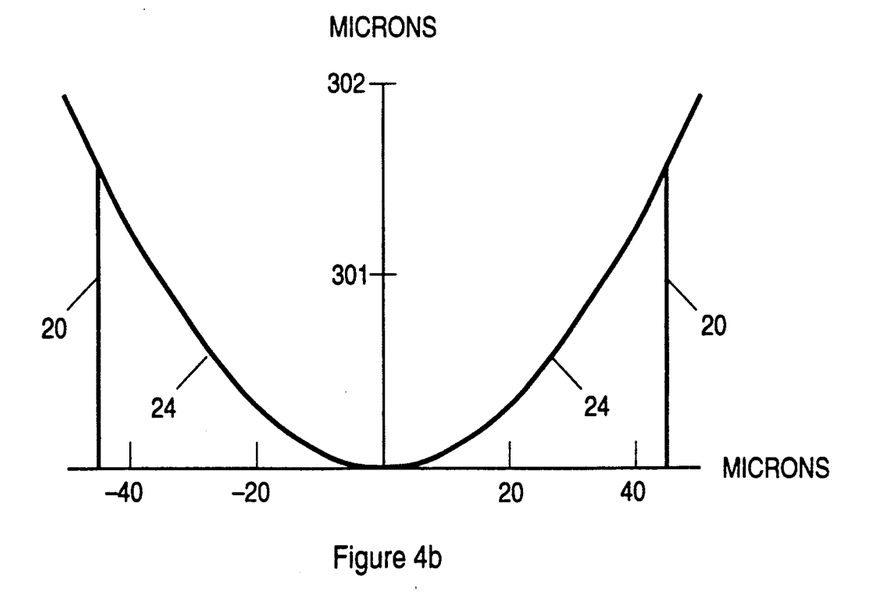
FIG. 4b is a magnified view of the diode light 18 and the hyperbolic lens surface 24 in the horizontal direction.
Figure 4C:
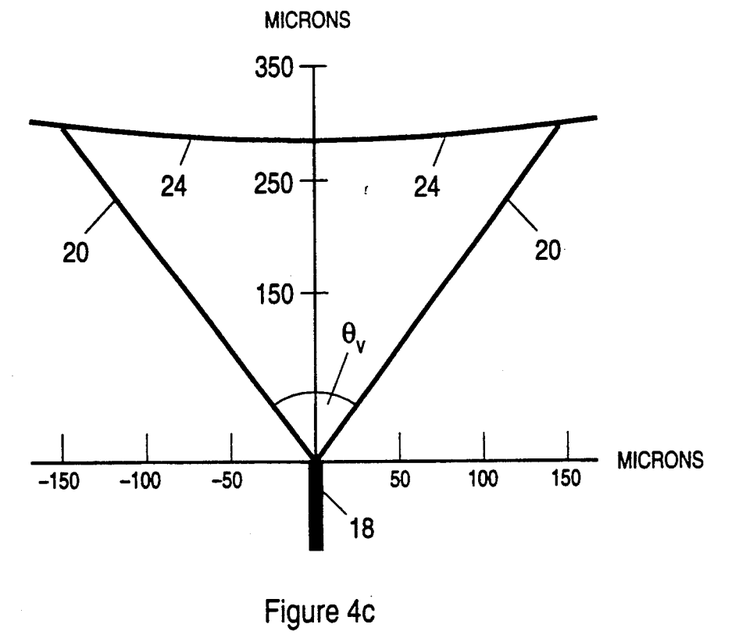
FIG. 4c shows the diode laser light ($1/e^2$ intensity) incident on a microlens element 24 in the vertical direction. The diode 18 is located at the origin of the graph.
Figure 4D:
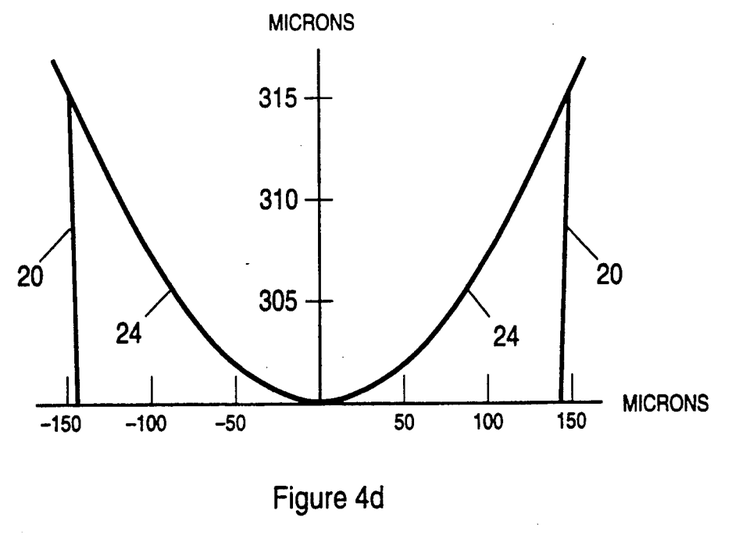
FIG. 4d is a magnified view of the diode light 18 and the hyperbolic lens surface 24 in the vertical direction.

Referring to FIGS. 4a–4d, calculations show that each microlens 24 captures all the light emitted from the diode stripe 18. For the diode 18, light 20 leaves at a horizontal angle $\theta_h$ of about 17 degrees (FIG. 4a) and a vertical angle $\theta_v$ of about 51 degrees (FIG. 4c). $\theta_h$ and $\theta_v$ are the $1/e^2$ divergence angles obtained from the half intensity angles of 10 degrees and 30 degrees. FIGS. 4b and 4d show the beam profiles of the pump light 20 from a single diode emitter 18 as the light intercepts the 300 micron focal length hyperbolic microlens horizontally (FIG. 4b) and vertically (FIG. 4d).

A variation of the basic embodiment would have two diode bars and their respective microlens assemblies arranged in parallel so that both collimated bars could be overlapped in the laser mode 10 by the lens 6. It is impractical to pump with more than two continuous wave 10 watt bars due to the complexity of accommodating the heat sinks for those bars and to the severe heating in the laser crystal 8.

For pulsed operation where the duty factor and thus the heating is considerably less, one can stack the diode bars in a careful manner so that each bar aligns with a row of microlenses within a two dimensional array of microlenses.

Figure 5:
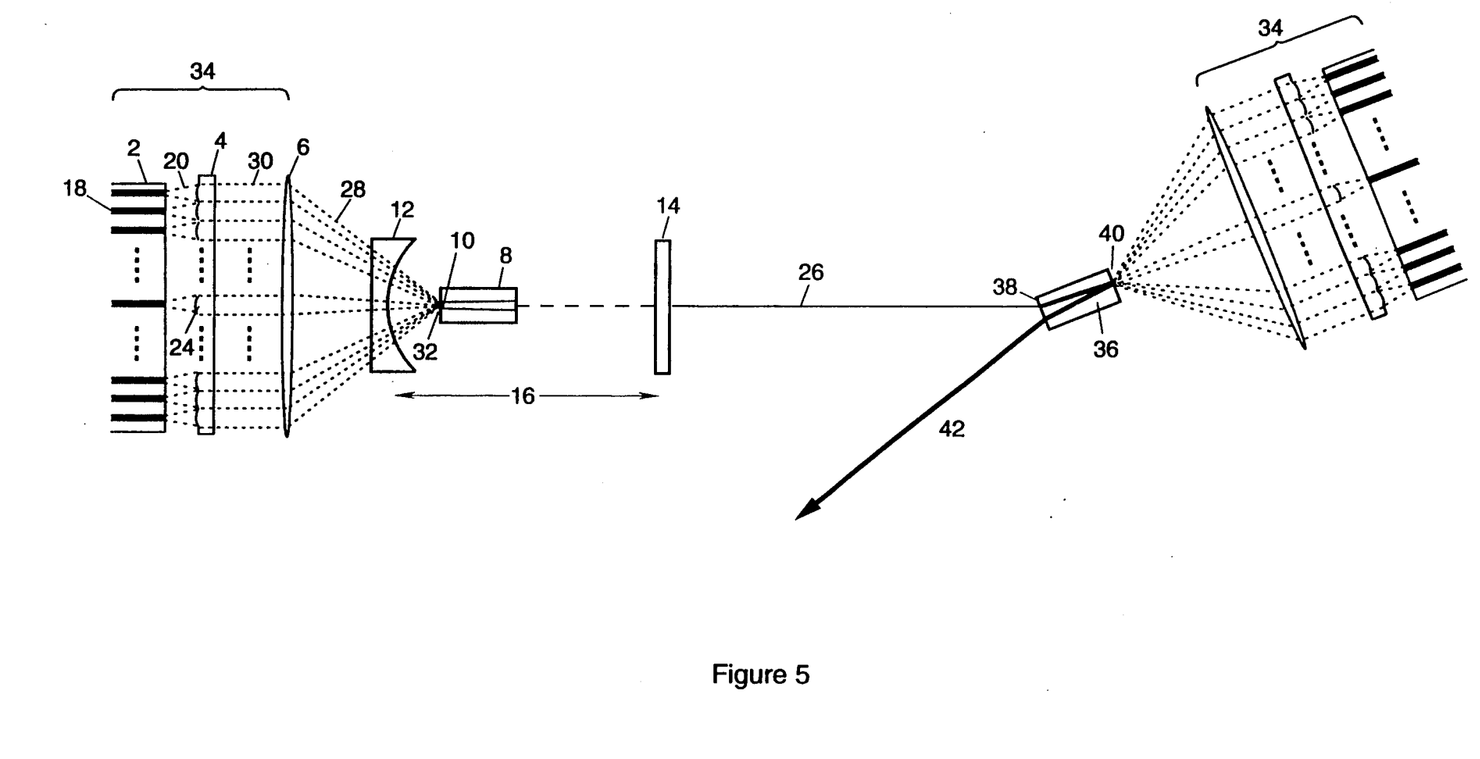
FIG. 5 is a plan view of an oscillator-amplifier configuration.

Another variation on the basic embodiment is depicted in FIG. 5 where the basic invention is modified to function as an amplifier. The basic pumping structure 34 is duplicated and the small diode laser spot is imaged in a laser crystal 36 such as Nd:YAG. The front face of the amplifier crystal 38 is coated to transmit the neodymium laser light and the other face 40 is coated to totally reflect the laser light and pass the diode light. Thus, when the output 26 from the basic oscillator is directed into the second crystal 36 it will be amplified to a higher level output 42.

Testing of this lens array with a device that mimics the output characteristics of the individual elements 18 of the bar showed that the lenses were capable of collimating the beam without loss despite their horizontal overlap. The far field divergence of this collimated beam was measured to be less than twice the diffraction limited value.

There are several advantages of this pumping arrangement over other types. First, longitudinal pumping is an efficient means for coupling energy to the resonator since the profile of the pump light can be readily matched to the laser mode.

Second, this method employs diode bar arrays rather than the use of many individual diodes that would require separate power supplies and temperature controllers to maintain the correct output. Diode bars are by far the most reliable, long-lived, compact and economical means for generating light output necessary to pump high-power solid-state lasers.

Third, the lens system has very low loss since it effectively contains only two optical elements, the microlens and the macrolens, both of which can be easily anti-reflection coated. In comparison to the recently developed strategy of employing a bundle of optical fibers, which is 50 percent lossy, the microlens system will reach nearly 100 percent throughput with the proper coatings and geometrical alignment. We have demonstrated 90 percent throughput of a single element index guided laser after accounting for Fresnel losses in the uncoated array. The collimated spot after the lens array was observed to be less than two times the diffraction limited value.

Fourth, each laser element is an index-guided single-stripe, single transverse-mode laser rather than a gain-guided stripe or a phase coupled array, as is typical of most high power diode bar devices. The light output from an index-guided element, in contrast to a gain-guided element, has a more uniform wavefront. This key attribute allows for the formation of a single spot at the gain medium that possesses a smoothly varying intensity distribution. Furthermore, the overall wall plug efficiency of index-guided devices is typically higher than that of gain-guided devices. The overall wall plug efficiency for an index-guided diode bar is expected to be about 40 to 60 percent. This embodiment has the potential for demonstrating the highest overall efficiency due to the optimization of the diode devices, the coupling scheme, and the solid-state laser pump geometry. This laser pumping scheme minimizes the number of independent components while improving performance to the practical limit of the art.

Fifth, the approach supports a wide variety of laser devices. Up to the limits of physical space or disruptive heating, one can employ many bars, pulsed or continuous wave. The construct can also serve as an amplifier with the output coupler removed. The simple geometry of the approach opens the resonator to applications of various prior arts, such as Q-switching, cavity-dumping, mode locking, frequency conversion and frequency mixing.

It will be obvious to one skilled in the art that changes and modifications in the embodiments described above can be carried out without departing from the scope of the invention, as defined in the claims.

We claim:
1. A high-efficiency, compact, diode-pumped laser apparatus, comprising:
    a. a laser rod with a first end and a second end;
    b. a housing for holding the laser rod;
    c. a laser diode array means, comprising a plurality of semiconductor single mode diode lasers;
    d. a first lens means, comprising a matching array of lenses for collimating the output of the array of single mode lasers;
    e. a second lens means, positioned between the first lens and the laser rod, whereby the output of the first lens array means is overlapped on the first end of the laser rod.
2. The apparatus as claimed in claim 1 wherein said laser rod contains neodymium ions as a laser active species.
3. The apparatus as claimed in claim 1 wherein said laser rod contains chromium ions as a laser active species.
4. The apparatus as claimed in claim 1 wherein said laser diode array means is a laser diode bar.
5. The apparatus as claimed in claim 1 wherein said single mode lasers are index-guided.
6. The apparatus as claimed in claim 1 wherein said matching lens array is formed out of gallium phosphide.
7. The apparatus as claimed in claim 1 wherein said matching lens array is formed out of arsenic trisulphide.
8. The apparatus as claimed in claim 1 wherein said matching lens array is formed out of glass.
9. The apparatus as claimed in claim 1 wherein said lenses are hyperbolic lenses.
10. A high-efficiency, compact, diode-pumped laser amplifier apparatus, comprising:
    a. a laser rod with a first end and a second end;
    b. a housing for holding the laser rod;
    c. a laser diode array means, comprising a plurality of semiconductor single mode diode lasers;
    d. a first lens means, comprising a matching monolithic array of lenses for collimating the output of the array of single mode lasers;
    e. a second lens means, positioned between the first lens and the laser rod, for overlapping the output of the first lens array means on the first end of the laser rod;
    f. a second source of laser light positioned to input laser light through the second end of the laser rod such that the second laser beam overlaps the pumped region of the laser rod.

11. A method for producing a microlens array for use with a laser diode array comprising:
   a. selecting an optical material that is transparent to the wavelength of the output light from the diode array;
   b. fabricating the material in the form of thin, flat wafers with a polished front face;
   c. masking the front face of the material with an array of circular patterns where the diameter of the pattern circle is proportional to the diameter of the microlens being produced;
   d. exposing the unmasked material to light;
   e. etching the unmasked material away;
   f. repeating the cycle of c through e above, whereby a terraced approximation of the shape of the microlens is produced;
   g. heat treating the material until the terraced shapes are smoothed to lens shapes.

12. The method claimed in claim 11 wherein the diameter of the pattern circle ranges from 30 microns to the diameter of the microlens being produced.

13. The method claimed in claim 11 wherein the light is about 0.81 microns in wavelength.

14. The method claimed in claim 11 wherein the light is about 0.65 microns in wavelength.

15. The method claimed in claim 11 wherein the material is etched away by ion milling.

16. The method claimed in claim 11 wherein the cycle is repeated ten times.

17. The method as claimed in claim 11 wherein the optical material is gallium phosphide and the heat treating is done in the presence of elemental phosphorus.

18. A high-frequency, compact apparatus for producing a collimated, uniform beam of laser light comprising:
   a. a laser diode array means, comprising a plurality of semiconductor single mode diode lasers; and
   b. a lens means, comprising a matching array of non-spherical lenses, whereby light from the diode array means is collimated by a matching lens and appears in the far field as the output of a single laser amplified by the number of elements in the array.

19. A method for smoothing a gallium phosphide surface comprising the steps of:
   a. inserting the gallium phosphide into a quartz tube;
   b. adding elemental phosphorous;
   c. evacuating the tube;
   d. sealing the tube to create a sealed capsule; and
   e. heating the capsule to temperatures of 1050 degrees Centigrade or higher for a duration to achieve a desired degree of smoothing.

* * * * *